United States Patent
Atarashi et al.

(10) Patent No.: US 7,583,048 B2
(45) Date of Patent: Sep. 1, 2009

(54) CONTROLLER FOR MOTOR

(75) Inventors: Hirofumi Atarashi, Wako (JP); Hiroyuki Isegawa, Wako (JP); Tamotsu Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 11/717,636

(22) Filed: Mar. 14, 2007

(65) Prior Publication Data
US 2008/0024082 A1 Jan. 31, 2008

(30) Foreign Application Priority Data
Mar. 22, 2006 (JP) .............................. 2006-078552

(51) Int. Cl.
*H02P 3/18* (2006.01)
(52) U.S. Cl. ..................... 318/807; 318/730; 318/34
(58) Field of Classification Search .............. 318/807, 318/34, 730
See application file for complete search history.

(56) References Cited
U.S. PATENT DOCUMENTS

| | | | | |
|---|---|---|---|---|
| 6,049,152 A * | 4/2000 | Nakano | ............... | 310/114 |
| 6,335,606 B1 * | 1/2002 | Minagawa et al. | ........... | 318/801 |
| 6,472,845 B2 * | 10/2002 | Minagawa et al. | ........... | 318/801 |
| 6,563,246 B1 * | 5/2003 | Kajiura et al. | ............... | 310/162 |
| 6,774,591 B2 * | 8/2004 | Arimitsu et al. | ............. | 318/154 |
| 6,867,560 B2 * | 3/2005 | Arimitsu | ..................... | 318/144 |
| 6,998,757 B2 * | 2/2006 | Seguchi et al. | .............. | 310/266 |

FOREIGN PATENT DOCUMENTS

| | | |
|---|---|---|
| EP | 1 350 665 A2 | 8/2003 |
| JP | 2002-204541 A | 7/2002 |
| JP | 2004072978 A | 3/2004 |

* cited by examiner

*Primary Examiner*—Lincoln Donovan
*Assistant Examiner*—Renata McCloud
(74) *Attorney, Agent, or Firm*—ArentFox LLP (57) ABSTRACT

A controller for a motor carries out field weakening control by using a simple construction to change the phase difference between two rotors, which are disposed around a rotating shaft, without depending on the number of revolutions of a motor. The controller for a motor includes a field weakening current calculator for calculating a field weakening current command value on the basis of the radius of a target voltage circle, a d-axis voltage command value, and a q-axis voltage command value, a rotor phase difference command value determiner for determining a command value of a rotor phase difference on the basis of the field weakening current command value, and a current command value determiner for determining a d-axis current command value and a q-axis current command value on the basis of the rotor phase difference command value and a torque command value.

6 Claims, 12 Drawing Sheets

CONTROLLER FOR MOTOR

BACKGROUND OF THE INVENTION

1. Field of the Invention

The present invention relates to a controller for a motor adapted to carry out field weakening control of a permanent magnet field type rotary motor by changing a phase difference between two rotors disposed around a rotating shaft.

2. Description of the Related Art

Hitherto, there has been known a permanent magnet field type rotary motor which is equipped with a first rotor and a second rotor concentrically provided around a rotating shaft thereof and which is adapted to conduct the field weakening control by changing the phase difference between the first rotor and the second rotor according to a rotational velocity (refer to, for example, Japanese Unexamined Patent Application Publication No. 2002-204541).

In such a conventional motor, the first rotor and the second rotor are connected through the intermediary of a member that is displaced in the radial direction when subjected to a centrifugal force. The motor is configured such that, when the motor is in a halting state, the magnetic poles of the permanent magnets disposed in the first rotor and the magnetic poles of the permanent magnets disposed in the second rotor are oriented in the same direction, providing a maximum magnetic flux of the field, while the phase difference between the first rotor and the second rotor increases due to a centrifugal force as the rotational velocity of the motor increases, thus reducing the magnetic fluxes of the field.

Figure 12:
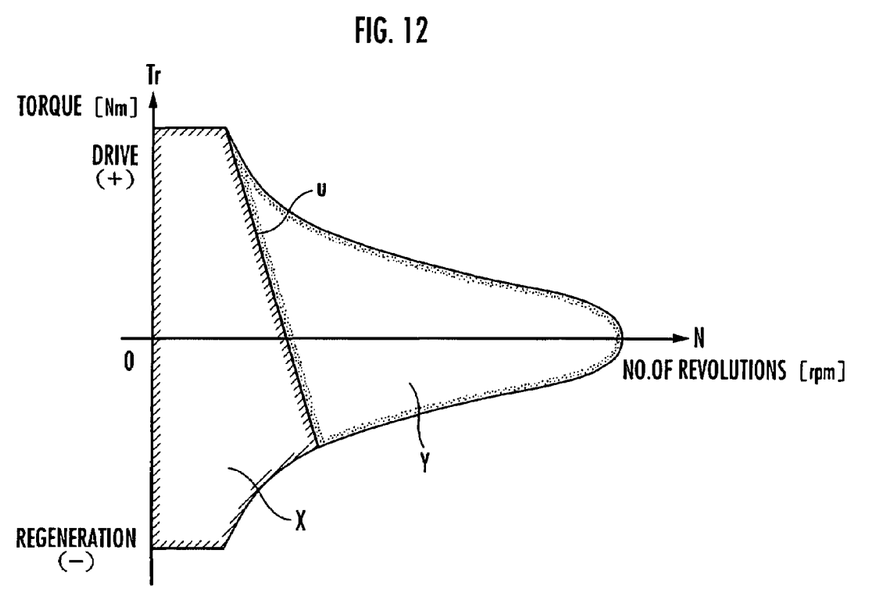
FIG. 12 is an explanatory diagram of a range in which a field of the motor need to be weakened.

FIG. 12 shows a range in which the fields of the motor need to be weakened. In the figure, the axis of ordinates indicates output torque Tr and the axis of abscissas indicates the number of revolutions N. The character "u" in the figure denotes an orthogonal line of the motor. The line u is formed by connecting points at which a phase voltage of the motor becomes equal to a supply voltage, depending on a combination of the number of revolutions and an output torque when the motor is actuated without carrying out the field weakening control. The character X in the figure denotes a range in which the field is not required to be weakened, while Y denotes a range in which the field is required to be weakened.

As shown in FIG. 12, the range Y in which the field need to be weakened is determined by the number of revolutions N and the output torque Tr of the motor. Hence, the conventional field weakening control, which depends merely on the number of revolutions, tends to inconveniently result in an excessive or insufficient control amount for weakening the field.

Basically, the field weakening control is intended to reduce a back electromotive force produced in an armature by the revolution of the motor so as to restrain a voltage between terminals of the armature from becoming higher than a supply voltage, thereby allowing the motor to be used in a higher revolution range. When changing the phase difference between the first rotor and the second rotor by the number of revolutions of the motor or a centrifugal force, only the number of revolutions is the parameter for changing the weakening of the field. This inconveniently prevents flexible changes of the controllable range of output torque or the number of revolutions of the motor.

Furthermore, in a motor that operates also as a generator, the operating efficiency is generally improved by using different field control amounts for a driving mode (positive output torque) and a power generating mode (negative output torque), respectively, when the number of revolutions remains the same. However, when changing the phase difference between the first rotor and the second rotor by the number of revolutions or a centrifugal force, it is disadvantageous that the field control amount cannot be changed between the driving mode and the power generating mode.

SUMMARY OF THE INVENTION

The present invention has been made with a view of the aforesaid background, and it is an object of the invention to provide a controller for a motor that is capable of carrying out field weakening control by using a simple construction to change the phase difference between two rotors disposed around a rotating shaft, without depending on the number of revolutions of a motor.

To this end, according to the present invention, there is provided a controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference, which is the phase difference between the first rotor and the second rotor. The field control includes field weakening control for reducing the magnetic fluxes of the fields of the motor and field strengthening control for increasing the magnetic fluxes of the fields of the motor.

The controller for a motor in accordance with the present invention includes: a rotor position detector for detecting a position of the first rotor; an energization controller which controls energization of the motor by converting the motor into an equivalent circuit based on a two-phase DC rotating coordinate system composed of a d-axis in the direction of a magnetic flux of a field and a q-axis, which is orthogonal to the d-axis, on the basis of a position of the first rotor, and by controlling the amount of energization of an armature on the d-axis and the amount of energization of an armature on the q-axis; a field weakening current command value determiner for determining a field weakening current command value, which indicates the amount of energization of the armature on the d-axis that is required for obtaining a predetermined field weakening effect; a rotor phase difference command value determiner for determining a command value of the rotor phase difference on the basis of the field weakening current command value; and a rotor phase difference changer for changing the rotor phase difference on the basis of the rotor phase difference command value.

With this arrangement, the field current command value determiner determines the field weakening current command value for weakening the field in the motor by using the amount of energization of the armature on the d-axis, which is generally used in the energization control of the motor based on the equivalent circuit. The rotor phase difference command value determiner determines the command value of the rotor phase difference on the basis of the field weakening current command value. This makes it possible to determine the command value of the rotor phase difference by a simple construction that utilizes the construction of the conventionally provided field weakening command value determiner to control the energization of the motor by the equivalent circuit. Thus, the field weakening current control of the motor can be accomplished by changing the rotor phase difference by the rotor phase difference changer without depending on the number of revolutions of the motor.

The controller for a motor further includes an inverter circuit for converting DC power supplied from a DC power source into multiphase AC power to be supplied to the armatures of the motor, wherein the field weakening current command value determiner determines the field weakening current command value such that the magnitude of a composite vector of a voltage between the terminals of the armature on the d-axis and a voltage between the terminals of the armature on the q-axis in the equivalent circuit is not more than a predetermined voltage set to be not more than an output voltage of the DC power source.

With this arrangement, the upper limit of the rotative range of the motor can be extended within a range which does not exceed the aforesaid predetermined voltage by determining the field weakening current command value such that the magnitude of the composite vector of the voltage between the terminals of the armature on the d-axis and the voltage between the terminals of the armature on the q-axis is not more than the predetermined voltage that has been set to be not more than the output voltage of the DC power source and then by changing the rotor phase difference.

Further, the controller for a motor includes a current command value determiner for determining a command value of the amount of energization of the armature on the q-axis and a command value of the amount of energization of the armature on the d-axis on the basis of the command value of the rotor phase difference and a predetermined torque command value, wherein the energization controller controls the amount of energization of the armature on the q-axis and the amount of energization of the armature on the d-axis on the basis of the command value of the amount of energization of the armature on the q-axis and the command value of the amount of energization of the armature on the d-axis determined by the current command value determiner.

With this arrangement, in the case where the rotor phase difference changes, then the magnetic fluxes of the fields of the motor change, so that the amount of energization of the armature on the q-axis and the amount of energization of the armature on the d-axis that are necessary to set the output torque of the motor to the torque command value change accordingly. Hence, the current command value determiner determines the command value of the amount of energization of the armature on the q-axis and the command value of the amount of the energization of the armature on the d-axis on the basis of the command value of the rotor phase difference and the torque command value. This makes it possible to determine an appropriate command value of the amount of energization of the armature on the q-axis and an appropriate command value of the amount of the energization of the armature on the d-axis that take into account the influences of changes in the magnetic fluxes of the fields of the motor.

Further, the current command value determiner estimates an induced voltage constant of the motor on the basis of a command value of the rotor phase difference and determines a command value of the amount of energization of the armature on the q-axis and a command value of the amount of energization of the armature on the d-axis by using the estimated value of the induced voltage constant.

With this arrangement, in the case where the magnetic fluxes of the fields of the motor change as the rotor phase difference changes, then the induced voltage constant of the motor changes accordingly. This enables the current command value determiner to determine an appropriate command value of the amount of energization of the armature on the q-axis and an appropriate command value of the amount of energization of the armature on the d-axis on the basis of an actual field condition of the motor by using the estimated value of the induced voltage constant of the motor.

DESCRIPTION OF THE PREFERRED EMBODIMENTS

Figure 1:
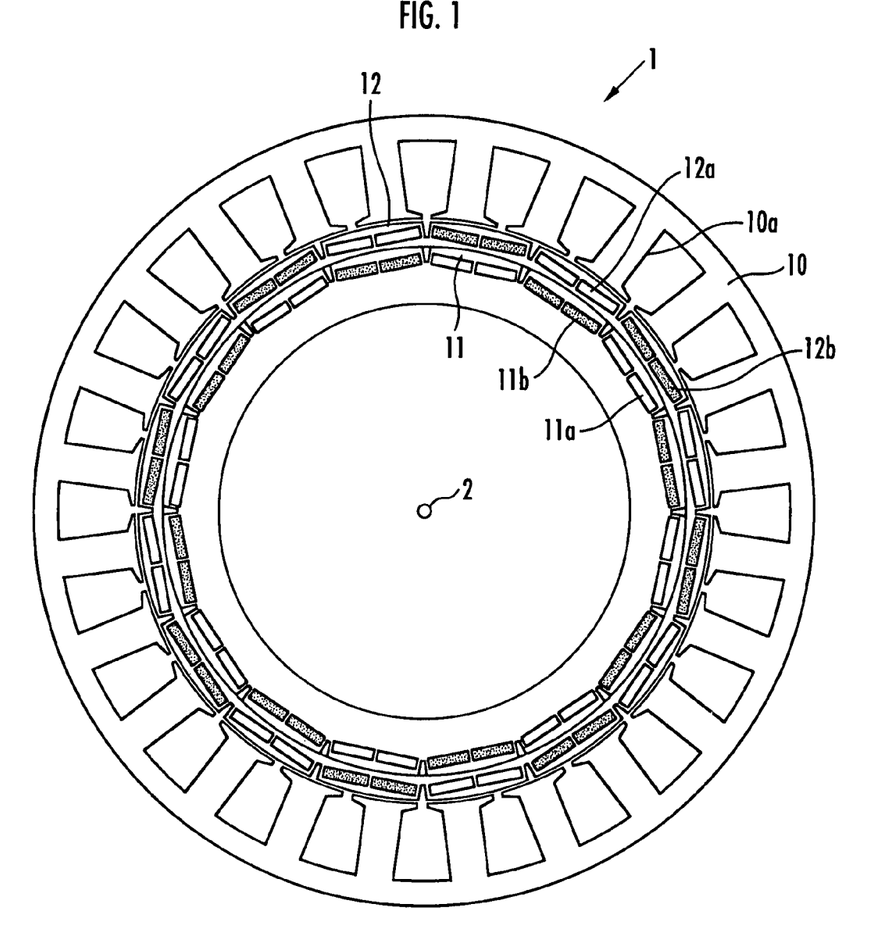
FIG. 1 is a configuration diagram of a DC brushless motor provided with a double rotor.
Figure 2:
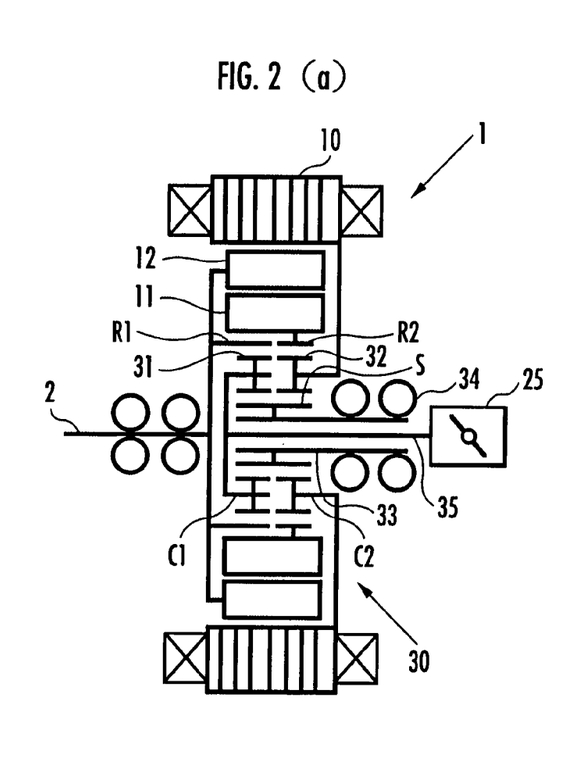
FIG. 2 presents a configuration diagram and an operation explanatory diagram of a mechanism for changing a phase difference between an outer rotor and an inner rotor of the DC brushless motor shown in FIG. 1.
Figure 3:
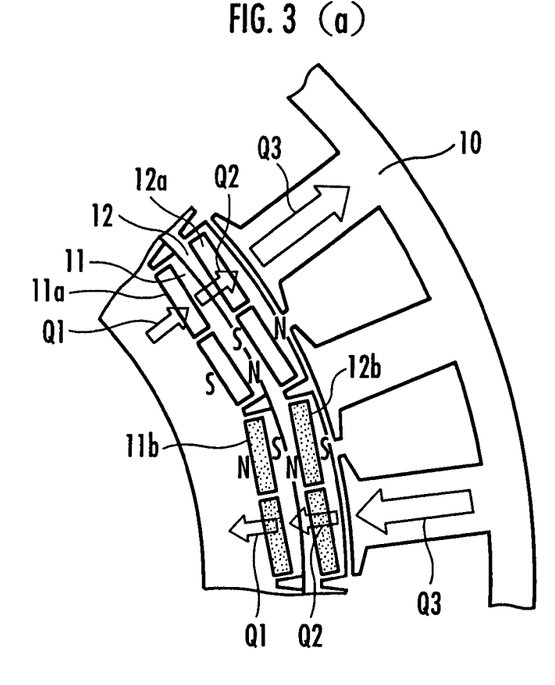
FIG. 3 presents explanatory diagrams of an advantage provided by changing the phase difference between the outer rotor and the inner rotor.
Figure 4:
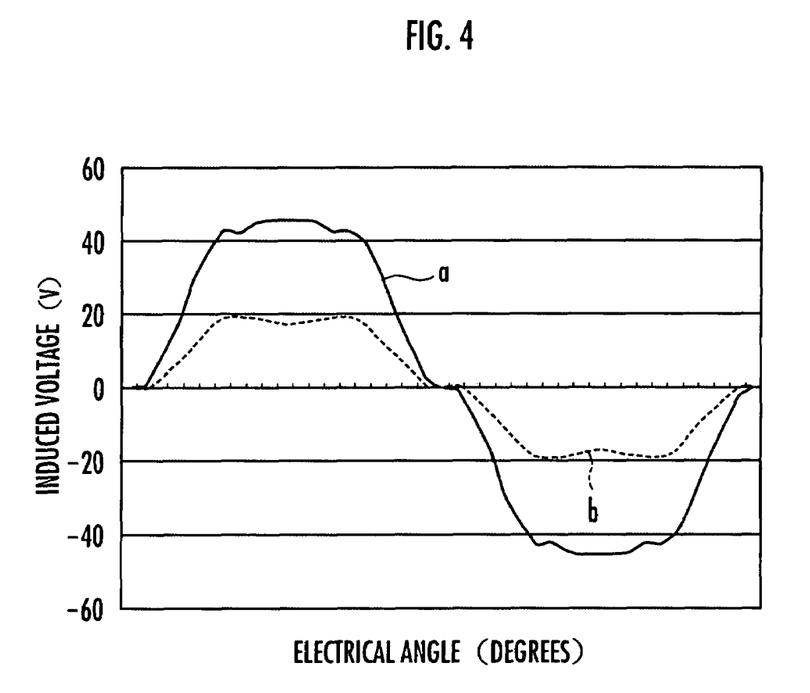
FIG. 4 is an explanatory diagram of the advantage provided by changing the phase difference between the outer rotor and the inner rotor.
Figure 5:
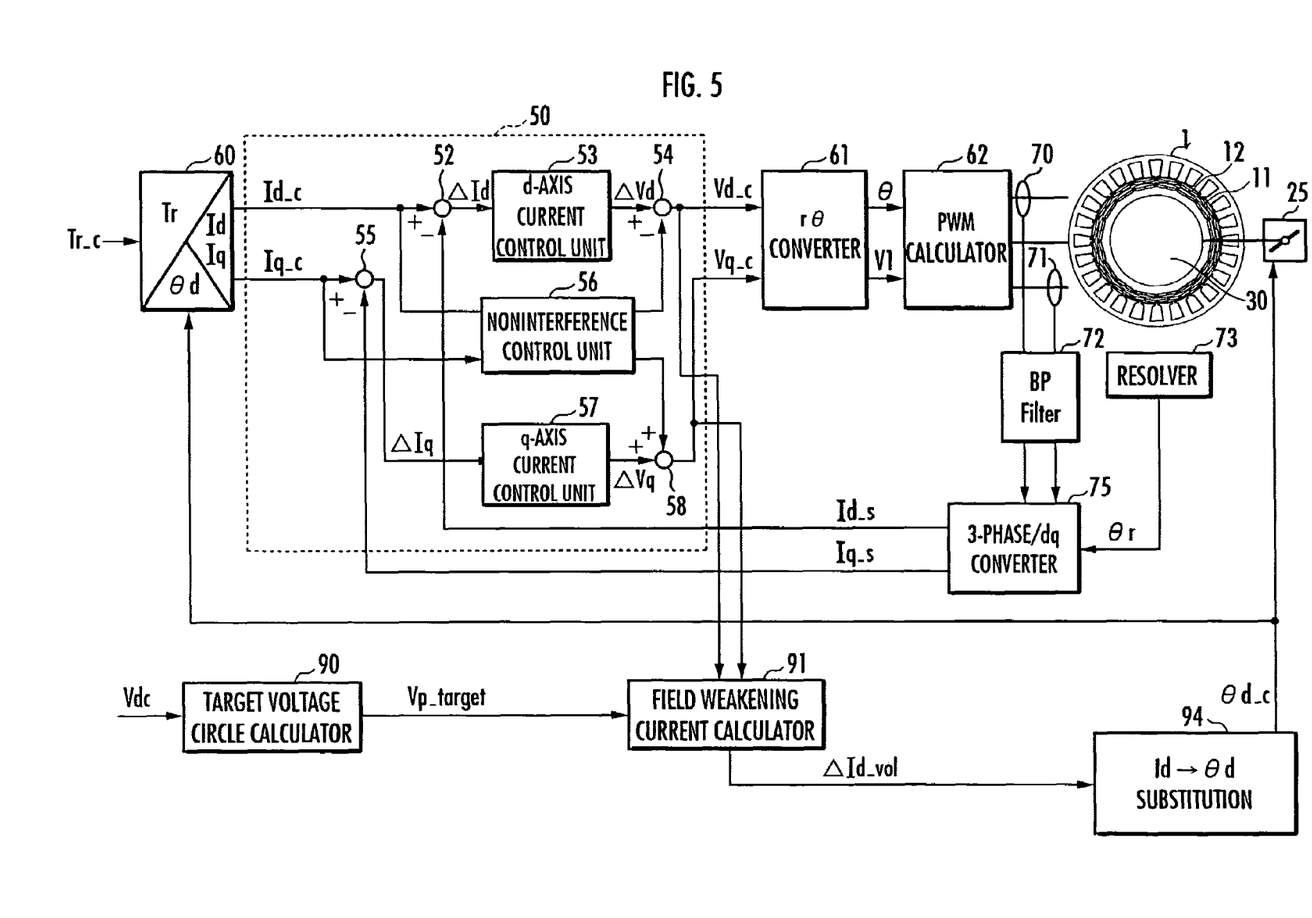
FIG. 5 is a control block diagram of a controller for a motor.
Figure 6:
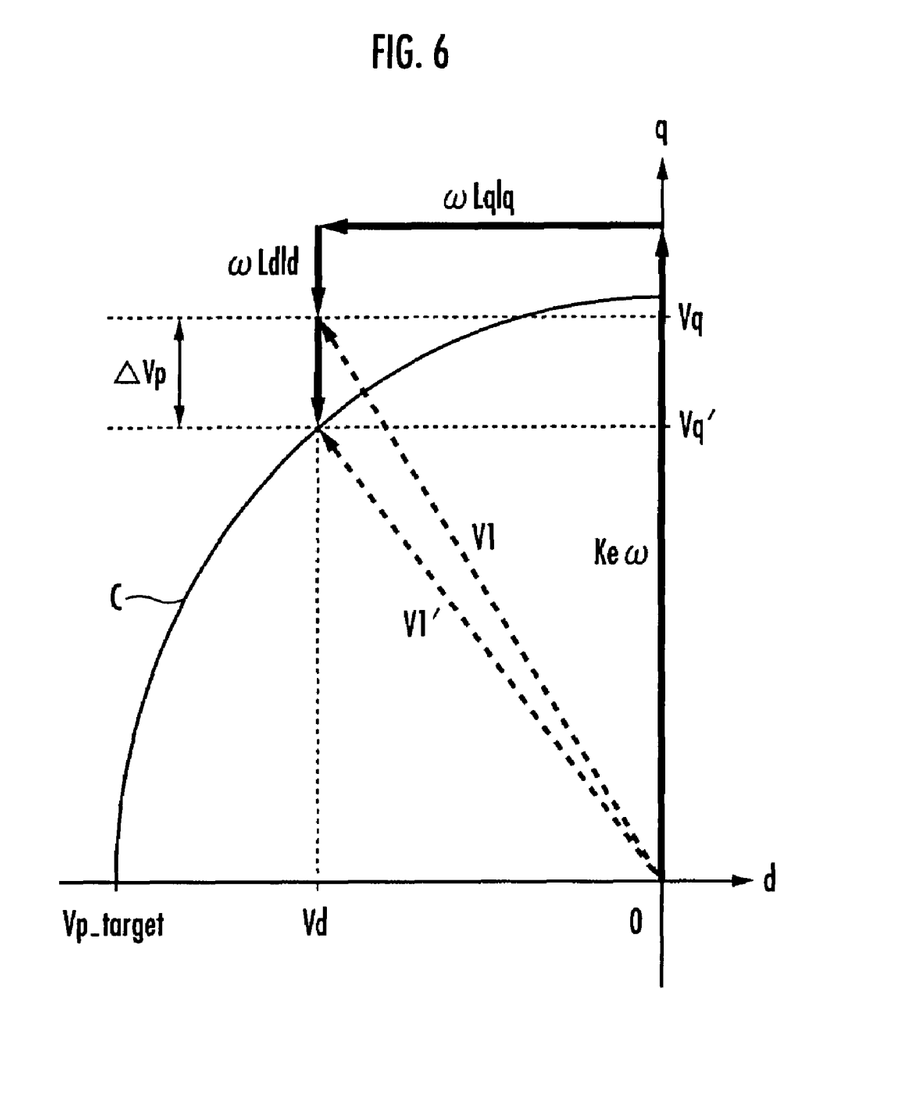
FIG. 6 is a voltage vector diagram in a d-q coordinate system.
Figure 7:
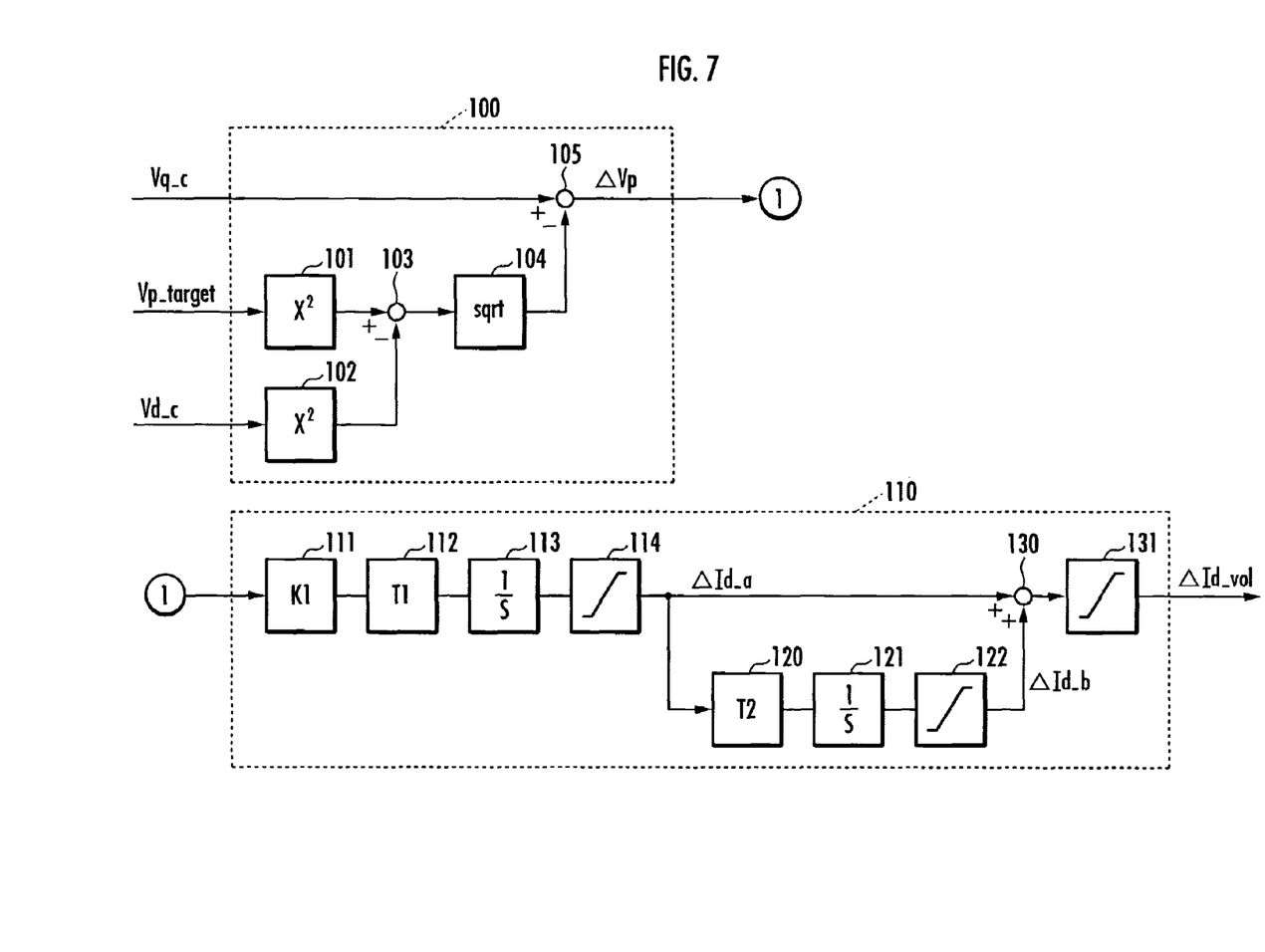
FIG. 7 is a block diagram of a field weakening current calculator.
Figure 8:
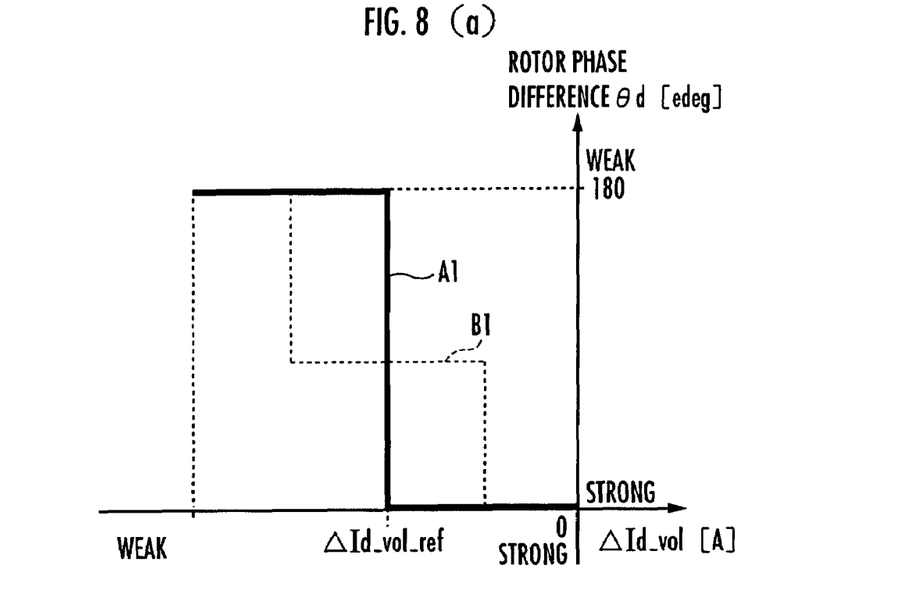
FIG. 8 presents explanatory diagrams of maps for determining a rotor phase difference based on a field weakening current.
Figure 9:
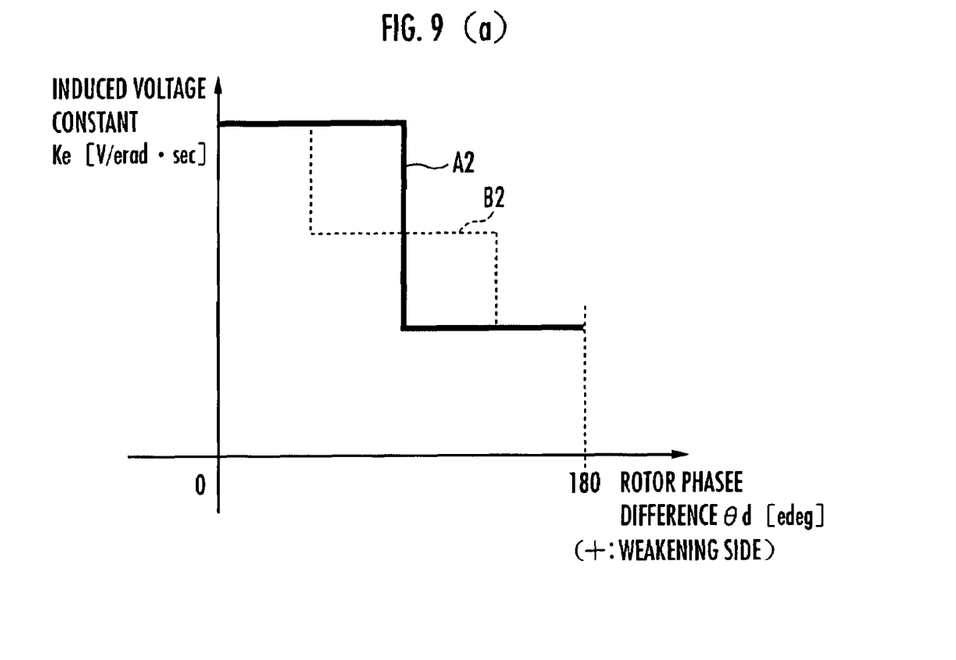
FIG. 9 presents explanatory diagrams of maps for determining an induced voltage constant based on a rotor phase difference.
Figure 10:
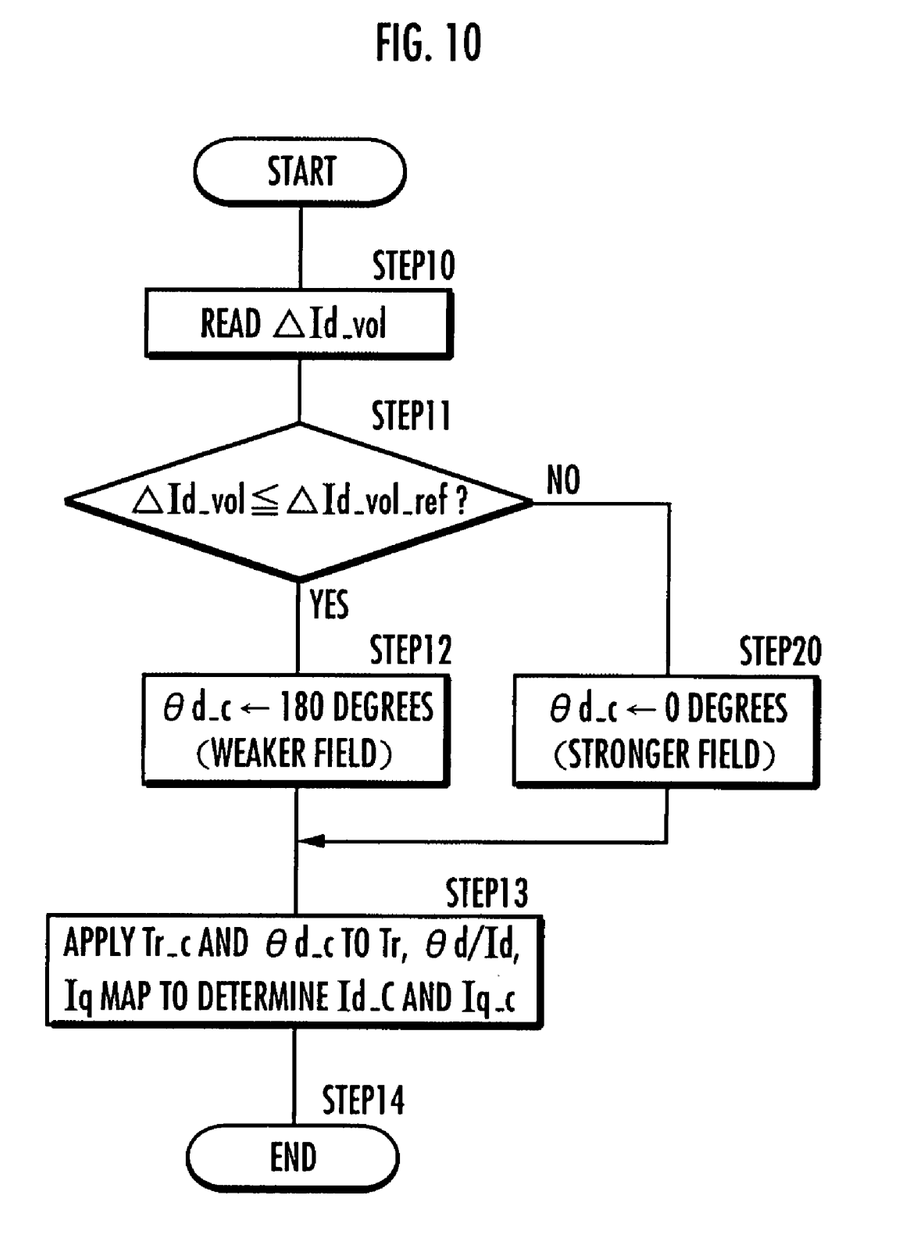
FIG. 10 is a flowchart of the processing for determining a command value of a rotor phase difference and the command values of the amounts of energization of a d-axis armature and a q-axis armature on the basis of a field weakening current command value.
Figure 11:
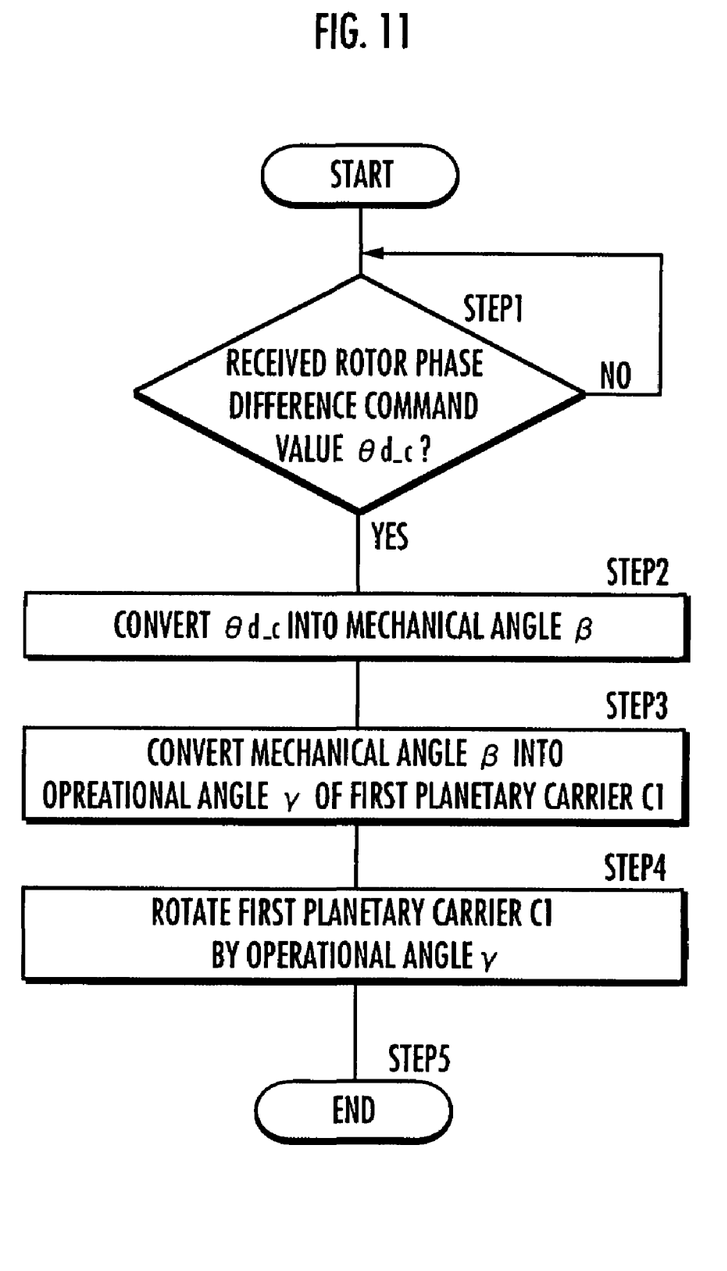
FIG. 11 is a flowchart of the processing for changing a rotor phase difference by an actuator.

An embodiment of the present invention will be explained with reference to FIG. 1 to FIG. 11. FIG. 1 is a configuration diagram of a DC brushless motor provided with a double rotor, FIG. 2 presents a configuration diagram and an operation explanatory diagram of a mechanism for changing a phase difference between an outer rotor and an inner rotor of the DC brushless motor shown in FIG. 1, FIG. 3 and FIG. 4 are explanatory diagrams of an advantage provided by changing the phase difference between the outer rotor and the inner rotor, FIG. 5 is a control block diagram of a controller for a motor, FIG. 6 is a voltage vector diagram in a d-q coordinate system, FIG. 7 is a block diagram of a field weakening current calculator, FIG. 8 presents explanatory diagrams of maps for determining a rotor phase difference based on a field weakening current, FIG. 9 presents explanatory diagrams of maps for determining an induced voltage constant based on a rotor phase difference, FIG. 10 is a flowchart of the processing for determining a command value of a rotor phase difference and the command values of the amounts of energization of a d-axis armature and a q-axis armature on the basis of a field weakening current command value, and FIG. 11 is a flowchart of the processing for changing a rotor phase difference by an actuator.

Referring to FIG. 1, a motor 1 in the present embodiment is a DC brushless motor equipped with an inner rotor 11 (corresponding to a second rotor in the present invention) having fields made of permanent magnets 11a and 11b disposed at equal intervals in the circumferential direction, an outer rotor 12 (corresponding to a first rotor in the present invention) having fields made of permanent magnets 12a and 12b disposed at equal intervals in the circumferential direction, and a stator 10 having an armature 10a for producing a rotating magnetic field relative to the inner rotor 11 and the outer rotor 12. The motor 1 is used as a driving source of, for example, a hybrid vehicle or an electric-powered vehicle, and operates as a motor and a generator when mounted in a hybrid vehicle.

The inner rotor 11 and the outer rotor 12 are concentrically disposed such that the rotating shafts thereof are both coaxial with a rotating shaft 2 of the motor 1. In the inner rotor 11, the permanent magnets 11a having their south poles adjacent to the rotating shaft 2 and permanent magnets 11b having their north poles adjacent to the rotating shaft 2 are alternately disposed. Similarly, in the outer rotor 12, the permanent magnets 12a having their south poles adjacent to the rotating shaft 2 and the permanent magnets 12b having their north poles adjacent to the rotating shaft 2 are alternately disposed.

The motor 1 further includes a planetary gear mechanism 30 shown in FIG. 2(a) to change a rotor phase difference, which is a phase difference between the outer rotor 12 and the inner rotor 11. Referring to FIG. 2(a), the planetary gear mechanism 30 is a single-pinion planetary gear mechanism disposed in a hollow portion of the inner rotor 11 on the inner circumferential side thereof. The planetary gear mechanism 30 includes a first ring gear R1 coaxially and integrally formed with the outer rotor 12, a second ring gear R2 coaxially and integrally formed with the inner rotor 11, a first planetary gear 31 engaging with the first ring gear R1, a second planetary gear 32 engaging with the second ring gear R2, a sun gear S, which is an idle gear engaging with the first planetary gear 31 and the second planetary gear 32, a first planetary carrier C1 which rotatively supports the first planetary gear 31 and which is rotatively supported by the rotating shaft 2, and a second planetary carrier C2 which rotatively supports the second planetary gear 32 and which is secured to the stator 10.

In the planetary gear mechanism 30, the first ring gear R1 and the second ring gear R2 have approximately the same gear configuration, and the first planetary gear 31 and the second planetary gear 32 have approximately the same gear configuration. The rotating shaft 33 of the sun gear S is coaxially disposed with the rotating shaft 2 of the motor 1 and rotatively supported by a bearing 34. Thus, the planetary gear mechanism 30 is configured such that the first planetary gear 31 and the second planetary gear 32 engage with the sun gear S, and the outer rotor 12 and the inner rotor 11 rotate in synchronization.

Further, a rotating shaft 35 of the first planetary carrier C1 is coaxially disposed with the rotating shaft 2 of the motor 1 and connected to an actuator 25. The second planetary carrier C2 is secured to the stator 10.

The actuator 25 hydraulically causes the first planetary carrier C1 to rotate in a forward direction or a reverse direction or restricts the rotation of the first planetary carrier C1 about the rotating shaft 2 in response to a control signal input from an external source. Then, as the first planetary carrier C1 is rotated by the actuator 25, a relative positional relationship (phase difference) between the outer rotor 12 and the inner rotor 11 changes. The planetary gear mechanism 30 and the actuator 25 constitute the rotor phase difference changer in the present invention. The actuator 25 may be an actuator that electrically rotates the first planetary carrier C1 rather than hydraulically.

FIG. 2(b) shows a relationship among the rotational velocities of the first ring gear R1, the first planetary carrier C1, the sun gear S, the second planetary carrier C2, and the second ring gear R2 in the planetary gear mechanism 30, the axis of ordinates indicating a rotational velocity Vr.

Referring to FIG. 2(b), the velocity of the second planetary carrier C2 secured to the stator 10 is zero. This means that, for example, when the sun gear S rotates in the reverse direction (Vr<0), the second ring gear R2 and the inner rotor 11 rotate in the forward rotational direction (Vr>0) at a velocity based on a ratio g2 of the sun gear S relative to the second ring gear R2.

In the case where the actuator 25 is not in operation (in the case where the first planetary carrier C1 is not being rotated by the actuator 25), then the rotational velocity of the first planetary carrier C1 is zero. Hence, the first ring gear R1 and the outer rotor 12 rotate in the reverse direction relative to the rotating sun gear S at a velocity based on the gear ratio g1 of the sun gear S relative to the first ring gear R1. The gear ratio g1 and a gear ratio g2 are set to be approximately the same (g1≈g2), so that the inner rotor 11 and the outer rotor 12 rotate in synchronization, thus maintaining the phase difference between the inner rotor 11 and the outer rotor 12 at a constant value.

In the case where the actuator 25 is in operation (in the case where the first planetary carrier C1 is being rotated by the actuator 25), then the first ring gear R1 and the outer rotor 12 rotate in the reverse direction relative to the rotating sun gear S at a velocity obtained by increasing or decreasing a velocity based on the gear ratio g1 of the sun gear S relative to the first ring gear R1 by the rotational amount of the first planetary carrier C1. This changes the phase difference between the outer rotor 12 and the inner rotor 11.

The actuator 25 is constructed so as to be capable of rotating the first planetary carrier C1 in the forward direction or the reverse direction by at least a mechanical angle β (degrees)= (180/P)*g1/(1+g1) relative to the gear ratio g1 of the sun gear S with respect to the first ring gear R1 and the number of pairs of poles P of the motor 1.

Therefore, the phase difference between the outer rotor 12 and the inner rotor 11 can be changed toward an advance angle or a delay angle within the range of at least 180 degrees in terms of electrical angle. In this case, the motor 1 can be set, as appropriate, between a field-weakening mode wherein the permanent magnets 12a and 12b of the outer rotor 12 and the permanent magnets 11a and 11b of the inner rotor 11 are disposed with the same poles thereof opposing each other and a field-strengthening mode wherein the permanent magnets 12a and 12b of the outer rotor 12 and the permanent magnets 11a and 11b of the inner rotor 11 are disposed with opposite poles thereof opposing each other.

FIG. 3(a) shows the field-strengthening mode. The directions of magnetic fluxes Q2 of the permanent magnets 12a and 12b of the outer rotor 12 and the directions of magnet fluxes Q1 of the permanent magnets 11a and 11b of the inner rotor 11 are the same, leading to a large composite magnetic fluxes Q3. Meanwhile, FIG. 3(b) shows the field-weakening mode. The directions of the magnetic fluxes Q2 of the permanent magnets 12a and 12b of the outer rotor 12 and the directions of the magnet fluxes Q1 of the permanent magnets 11a and 11b of the inner rotor 11 are opposite to each other, causing the composite magnetic fluxes Q3 to be smaller.

FIG. 4 shows a graph comparing induced voltages produced in the armature of the stator 10 when the motor 1 is run at a predetermined number of revolutions in the mode shown in FIG. 3(a) and in the mode shown in FIG. 3(b), respectively, the axis of ordinates indicating induced voltage (V) and the axis of abscissas indicating electrical angle (degrees). In the graph, "a" denotes the mode shown in FIG. 3(a)(the field strengthening mode), while "b" denotes the mode shown in FIG. 3(b)(the field weakening mode). FIG. 4 shows that changing the phase difference between the outer rotor 12 and the inner rotor 11 causes a significant change in an induced voltage that is generated.

Thus, the induced voltage constant Ke of the motor 1 can be changed by increasing or decreasing the magnetic fluxes of the fields by changing the phase difference between the outer rotor 12 and the inner rotor 11. This makes it possible to expand an operative range relative to outputs and the number of revolutions of the motor 1, as compared with a typical motor equipped with one rotor having the induced voltage constant Ke fixed. Moreover, the operating efficiency of the motor 1 can be enhanced, because the copper loss of the motor 1 reduces, as compared with a case where the field weakening control is conducted by energizing the armature on the d-axis (field axis) by d-q coordinate conversion, which is commonly used for controlling a motor.

Referring now to FIG. 5 to FIG. 11, the controller for a motor in accordance with the present invention will be explained. The controller for a motor shown in FIG. 5 (hereinafter referred to simply as "the controller") converts the motor 1 into an equivalent circuit based on a two-phase DC rotary coordinate system in which the direction of field is indicated by the d-axis, while the direction that is orthogonal to the d-axis is indicated by the q-axis. The controller controls the amount of energization of the motor 1 such that torque based on a torque command value Tr_c received from an external source is output from the motor 1.

The controller is an electronic unit composed of a CPU, memories and the like, and includes a current command value determiner 60 (corresponding to the current command value determiner in the present invention) which determines a command value Id_c of a current to be supplied to the armature on the d-axis (hereinafter referred to as "the d-axis armature") (hereinafter referred to as "the d-axis current") and a command value Iq_c of a current to be supplied to the armature on the q-axis (hereinafter referred to as "the q-axis armature") (hereinafter referred to as "the q-axis current") on the basis of a torque command value Tr_c and a command value θd_c of the phase difference between the outer rotor 12 and the inner rotor 11 (rotor phase difference) of the motor 1, a three-phase/dq converter 75 which calculates a d-axis current detection value Id_s and a q-axis current detection value Iq_s by three-phase/dq conversion on the basis of current detection signals which are detected by current sensors 70 and 71 and from which unwanted components have been removed by a bandpass filter 72 and a rotor angle θr of the outer rotor 12 detected by a resolver 73 (corresponding to the rotor position detector in the present invention), an energization control unit 50 (corresponding to the energization controller in the present invention) which determines a command value Vd_c of a voltage between the terminals of the d-axis armature (hereinafter referred to as "the d-axis voltage") and a command value Vq_c of a voltage between the terminals of the q-axis armature (hereinafter referred to as "the q-axis voltage") such that a difference ΔId between the command value Id_c and the detection value Id_s of the d-axis current and a difference ΔIq between the command value Iq_c and the detection value Iq_s of the q-axis current are reduced, an rθ converter 61 which converts the command value Vd_c of the d-axis voltage and the command value Vq_c of the q-axis voltage into a component of a magnitude V1 and a component of an angle θ, and a PWM calculator 62 which converts the components of the magnitude V1 and the angle θ into a three-phase (U, V, W) AC voltage by PWM control (a function of the inverter circuit in the present invention being included).

The controller is further equipped with a target voltage circle calculator 90 for calculating a radius Vp_target of a target voltage circle, which will be discussed later, from an output voltage Vdc of a DC power source (not shown) supplying DC power to the PWM calculator 62, a field weakening current calculator 91 for calculating a field weakening current command value ΔId_vol on the basis of the radius Vp_target of the target voltage circle, the d-axis voltage command Vd_c, and the q-axis voltage command Vq_c (corresponding to the field weakening current command value determiner in the present invention), and a rotor phase difference command value determiner 94 for determining a rotor phase difference command value θd_c on the basis of the field weakening current command value ΔId_vol (corresponding to the rotor phase difference command value determiner in the present invention).

The energization control unit 50 includes a subtractor 52 for calculating a difference ΔId between the command value Id_c and a detection value Id_s of the d-axis current, a d-axis current control unit 53 for calculating a d-axis difference voltage ΔVd for producing the difference ΔId, a noninterference control unit 56 for calculating a component for cancelling the influences of velocity electromotive forces, which interfere with each other between the d-axis and the q-axis, on the basis of the d-axis current command value Id_c and the q-axis current command value Iq_c (noninterference component), a subtractor 54 for subtracting the noninterference component calculated by the noninterference control unit 56 from the d-axis difference voltage ΔVd, a subtractor 55 for calculating the difference ΔIq between the command value Iq_c and the detection value Iq_s of the q-axis current, a q-axis current control unit 57 for calculating a q-axis difference voltage ΔVq for producing the difference ΔIq, and an adder 58 for adding the noninterference component to the q-axis difference voltage ΔVq.

FIG. 6 explains the field weakening control in the d-q coordinate system, the axis of ordinates indicating the q-axis (torque axis) and the axis of abscissas indicating the d-axis (field axis). In the figure, C denotes a circle having the radius defined by Vp_target calculated by the target voltage circle calculator 90 (target voltage circle). Vp_target is set to, for example, Vdc*0.5 or Vdc/6$^{1/2}$ based on a sinusoidal modulation.

Vq denotes a q-axis voltage, Vd denotes a d-axis voltage, ω denotes an angular velocity of the motor 1, Lq denotes an inductance of the q-axis armature, Iq denotes a q-axis current, Ld denotes an inductance of the d-axis armature, Id denotes a d-axis current, and Ke denotes an induced voltage constant (Ke·ω denotes an induced voltage).

Referring to FIG. 6, a composite vector V1 of the q-axis voltage Vq and the d-axis voltage Vd is out of the target voltage circle C (|V1|>Vp_target). This prevents the PWM calculator 62 from energizing the q-axis armature and the d-axis armature. Hence, the field weakening current calculator 91 adds the current for producing ΔVp, which is calculated according to the following expression (1), to the amount of energization of the d-axis armature so as to accomplish the field weakening control to change the q-axis voltage from Vq to Vq'.

$$\Delta Vp = Vq - \sqrt{Vp\_target^2 - Vd^2} \qquad (1)$$

Thus, the composite vector of the d-axis voltage and the q-axis voltage is changed from V1 to V1'. The composite vector V1' lies within the target voltage circle C, thus making it possible to energize the q-axis armature.

The field weakening current calculator 91 is constituted of a ΔVp calculator 100 for calculating the above ΔVp and a ΔId_vol calculator 110 for calculating the field weakening current command value ΔId_vol on the basis of the ΔVp, as shown in FIG. 7. The ΔVp calculator 100 receives the target voltage circle radius Vp_target, the d-axis voltage command value Vd_c, and the q-axis voltage command value Vq_c. Further, the calculation of the above expression (1) is implemented by squaring devices 101, 102, a subtractor 103, a quadratic device 104, and a subtractor 105 to obtain ΔVp.

Further, the ΔId_vol calculator 110 multiplies ΔVp by a proportional gain K1 (111) and a time constant T1 (112), and also carries out integration processing (113), and also performs limiting processing (114) for restriction to a normal operation range of the motor 1. Then, the ΔId_a obtained by the limiting processing (114) and ΔId_b, which is obtained by multiplying the ΔId_a by a time constant T2 (120) and then by performing integral processing (121) and then by carrying out limiting processing for restriction to the normal operation range of the motor 1 (122), are added by an adder 130. The calculation result is subjected to limiting processing for restriction to the normal operation range of the motor 1 (131), thereby calculating the field weakening current command value ΔId_vol.

Subsequently, the operations of the rotor phase difference command value determiner 94 and the current command value determiner 60 will be explained according to the flowchart shown in FIG. 10. STEP10 to STEP12 and STEP20 shown in FIG. 10 are carried out by the rotor phase difference command value determiner 94. STEP13 is carried out by the current command value determiner 60.

The rotor phase difference command value determiner 94 uses the ΔId_vol/θd map shown in FIG. 8(*a*) to determine the rotor phase difference θd. According to the ΔId_vol/θd map shown in FIG. 8(*a*), A1 in the figure sets the rotor phase difference θd to zero degree (toward the field strengthening end) in the case where the field weakening current command value ΔId_vol is larger than ΔId_vol_ref (ΔId_vol_ref<ΔId_vol), while A1 sets the rotor phase difference θd to 180 degrees (toward the field weakening end) in the case where the field weakening current command value ΔId_vol is ΔId_vol_ref or less (ΔId_vol≦ΔId_vol_ref).

The A1 setting changes the rotor phase difference θd in two steps (0 degree and 180 degrees). Alternatively, however, the rotor phase difference θd may be changed in three steps, as shown by B1 setting, or even in four or more steps. Further alternatively, the rotor phase difference θd may be continuously changed in inverse proportion to the magnitude of the field weakening current command value ΔId_vol, as shown in FIG. 8(*b*).

The rotor phase difference command value determiner 94 reads, in STEP10, the field weakening current command value ΔId_vol calculated by the field weakening current calculator 91. Then, in the following STEP11, the rotor phase difference command value determiner 94 determines whether the field weakening current command value ΔId_vol is ΔId_vol_ref (refer to FIG. 8(*a*)) or less.

In the case where the field weakening current command value ΔId_vol is ΔId_vol_ref or less, then the rotor phase difference command value determiner 94 proceeds to STEP12 to set the rotor phase difference command value θd_c to 180 degrees according to the ΔId_vol/θd map shown in FIG. 8(*a*) and then proceeds to STEP13. Meanwhile, in the case where the field weakening current command value ΔId_vol is larger than ΔId_vol_ref, then the processing branches to STEP20 wherein the rotor phase difference command value determiner 94 sets the rotor phase difference command value θd_c to zero degrees according to the ΔId_vol/θd map shown in FIG. 8(*a*) and then proceeds to STEP13.

In STEP13, the current command value determiner 60 applies the torque command value Tr_c and the rotor phase difference command value θd_c to a Tr, θd/Id, Iq map stored in a memory (not shown) in advance to determine the d-axis current command value Id_c and the q-axis current command value Iq_c. The Tr, θd/Id, Iq map is prepared on the basis of experimental data or computer simulations, considering changes in the magnetic fluxes of the fields of the motor 1 that change according to the setting of the rotor phase difference θd.

Thus, when the setting of the rotor phase difference θd is changed, the d-axis current command value Id_c and the q-axis current command value Iq_c are changed accordingly, thus allowing appropriate Id_c and Iq_c to be determined on the basis of a field condition.

In the present embodiment, Id_c and Iq_c have been determined using the Tr, θd/Id, Iq map. Alternatively, however, the output torque of the motor 1 is proportional to the q-axis current and the induced voltage constant Ke, so that the q-axis current command value Iq_c and the d-axis current command value Id_c may be determined by estimating the induced voltage constant Ke of the motor 1.

Specifically, the A2 setting in the θd/Ke map shown in FIG. 9(*a*) is used to obtain the induced voltage constant Ke of the motor 1 associated with the rotor phase difference θd (0 degrees or 180 degrees), then the q-axis current command value Iq_c and the d-axis current command value Id_c that allow the torque command Tr_c to be obtained at the induced voltage constant Ke are determined.

In the case where the rotor phase difference θd is set in three steps by applying B1 in FIG. 8(*a*), then the induced voltage constant Ke is set also in three steps by applying B2 in FIG. 9(*a*). The same applies when the rotor phase difference θd is set in four or more steps. Further, in the case where the rotor phase difference θd is continuously changed in inverse proportion to the magnitude of the field weakening current command value ΔId_vol, as shown in FIG. 8(*b*), then the induced voltage constant Ke is also continuously changed in inverse proportion to the rotor phase difference θd, as shown in FIG. 9(*b*).

Referring now to the flowchart shown in FIG. 11, the operation of the actuator 25 will be explained. Upon receipt of the rotor phase difference command value θd_c from the rotor phase difference command value determiner 94 in STEP1 of FIG. 11, the actuator 25 converts the θd_c into a mechanical angle β in STEP2. Then, in the subsequent STEP3, the actuator 25 converts the mechanical angle β into an operational angle γ of the first planetary carrier C1, and rotates the first planetary carrier by the operational angle γ in STEP4.

The controller for a motor in the present embodiment has calculated the field weakening current command value ΔId_vol on the basis of the d-axis voltage command value Vd_c, the q-axis voltage command value Vq_c, and the target voltage circle radius Vp_target; however, the advantages of the present invention can be obtained even if a field weakening current command value is calculated using a different configuration.

What is claimed is:

1. A controller for a motor adapted to control an operation of a permanent magnet field type rotary motor having a first rotor and a second rotor, which have a plurality of fields produced by permanent magnets and which are disposed around a rotating shaft, by carrying out field control as a result of changing a rotor phase difference, which is a phase difference between the first rotor and the second rotor, the controller comprising:

a rotor position detecting means for detecting a position of the first rotor;

an energization controlling means for carrying out energization control of the motor by converting the motor into an equivalent circuit based on a two-phase DC rotating coordinate system composed of a d-axis in the direction of a magnetic flux of a field of the motor and a q-axis, which is orthogonal to the d-axis, on the basis of a position of the first rotor, and by controlling the amount of energization of an armature on the d-axis and the amount of energization of an armature on the q-axis;

a field weakening current command value determining means for determining a field weakening current command value, which indicates the amount of energization of the armature on the d-axis that is required for obtaining a predetermined field weakening effect;

a rotor phase difference command value determining means for determining a command value of the rotor phase difference on the basis of the field weakening current command value; and a rotor phase difference changing means for changing the rotor phase difference on the basis of the rotor phase difference command value.

2. The controller for a motor according to claim 1, further comprising:

an inverter circuit for converting DC power supplied from a DC power source into multiphase AC power to be supplied to the armatures of the motor, wherein the field weakening current command value determining means determines the field weakening current command value such that the magnitude of a composite vector of a voltage between the terminals of the armature on the d-axis and a voltage between the terminals of the armature on the q-axis in the equivalent circuit is not more than a predetermined voltage set to be not more than an output voltage of the DC power source.

3. The controller for a motor according to claim 2, further comprising:

a current command value determining means for determining a command value of the amount of energization of the armature on the q-axis and a command value of the amount of energization of the armature on the d-axis on the basis of the command value of the rotor phase difference and a predetermined torque command value, wherein the energization controlling means controls the amount of energization of the armature on the q-axis and the amount of energization of the armature on the d-axis on the basis of the command value of the amount of energization of the armature on the q-axis and the command value of the amount of energization of the armature on the d-axis determined by the current command value determining means.

4. The controller for a motor according to claim 3, wherein the current command value determining means estimates an induced voltage constant of the motor on the basis of a command value of the rotor phase difference and determines a command value of the amount of energization of the armature on the q-axis and a command value of the amount of energization of the armature on the d-axis by using the estimated value of the induced voltage constant.

5. The controller for a motor according to claim 1, further comprising:

a current command value determining means for determining a command value of the amount of energization of the armature on the q-axis and a command value of the amount of energization of the armature on the d-axis on the basis of the command value of the rotor phase difference and a predetermined torque command value, wherein the energization controlling means controls the amount of energization of the armature on the q-axis and the amount of energization of the armature on the d-axis on the basis of the command value of the amount of energization of the armature on the q-axis and the command value of the amount of energization of the armature on the d-axis determined by the current command value determining means.

6. The controller for a motor according to claim 5, wherein the current command value determining means estimates an induced voltage constant of the motor on the basis of a command value of the rotor phase difference and determines a command value of the amount of energization of the armature on the q-axis and a command value of the amount of energization of the armature on the d-axis by using the estimated value of the induced voltage constant.

* * * * *